Dec. 6, 1966 T. HAFNER 3,290,626
SURFACE WAVE TRANSMISSION
Filed Dec. 28, 1964 3 Sheets-Sheet 1
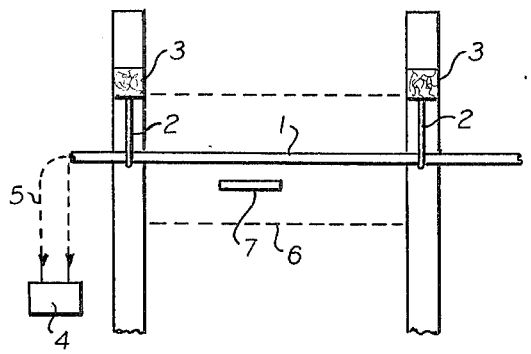
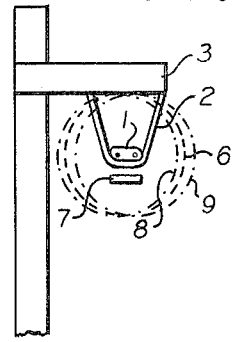
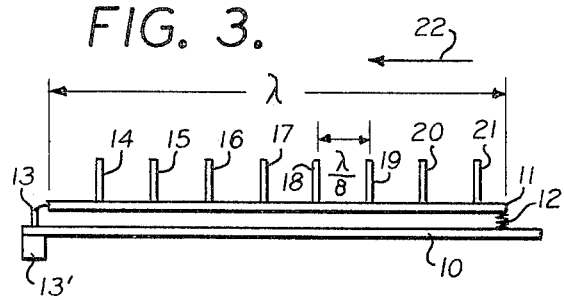
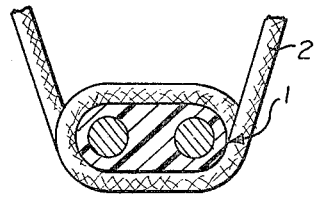
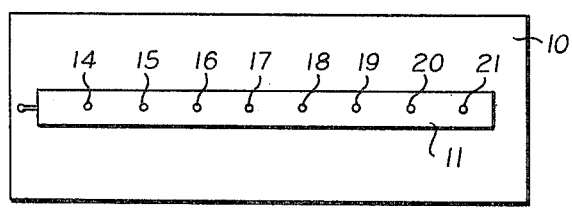
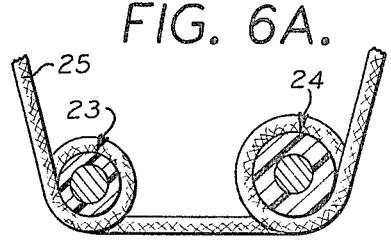
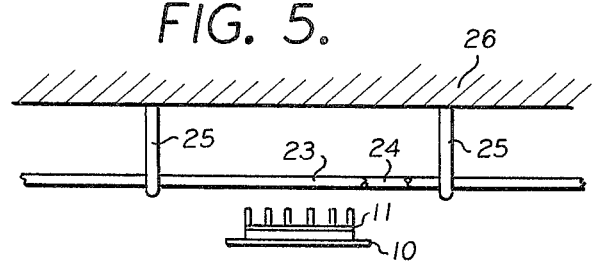
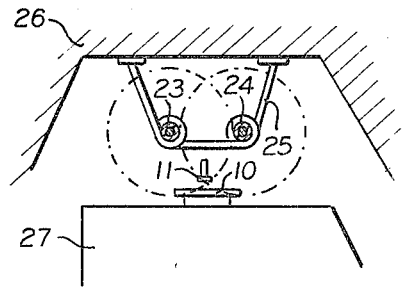
INVENTOR
THEODORE HAFNER

INVENTOR
THEODORE HAFNER

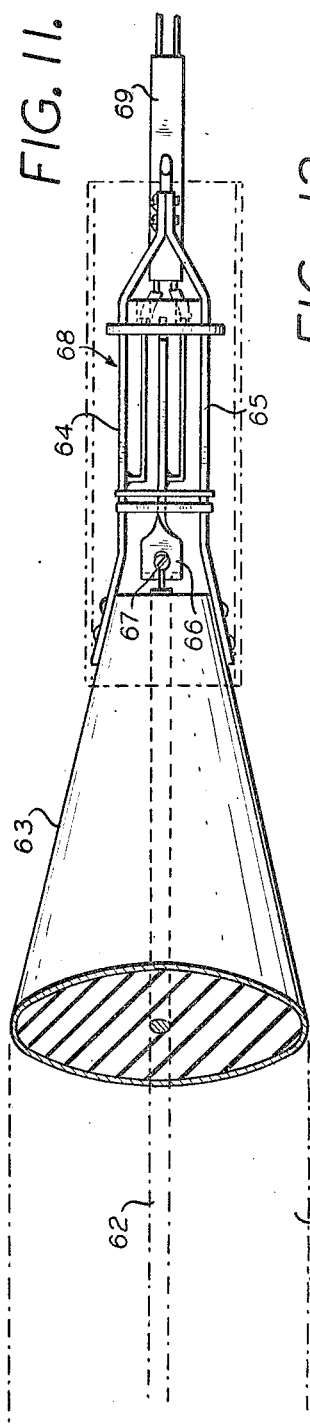
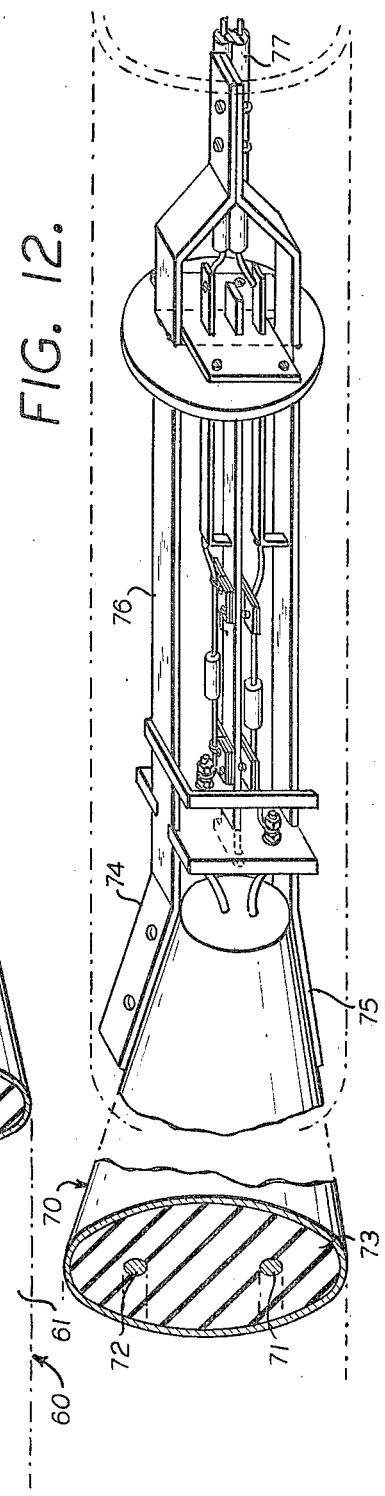
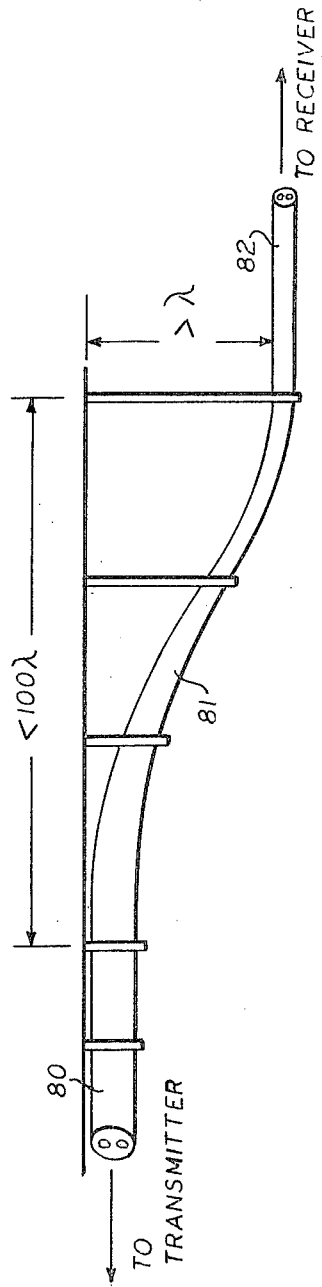
INVENTOR
THEODORE HAFNER

United States Patent Office 3,290,626
Patented Dec. 6, 1966

3,290,626
SURFACE WAVE TRANSMISSION
Theodore Hafner, 1501 Broadway, New York, N.Y.
Filed Dec. 28, 1964, Ser. No. 421,539
8 Claims. (Cl. 333—95)

This invention is a continuation-in-part of application Serial No. 83,244, filed January 17, 1961, now abandoned.

This invention relates to the transmission of electromagnetic waves and, more specifically, to the transmission of surface waves along one or more conductor elements.

It has been found that symmetrical transmission lines, and especially two-wire transmission lines, after extension over considerable distance, experience a degradation of their field characteristic causing increasing loss and standing waves, making long distance transmission of an extended frequency range unreliable, if not unfeasible, unless complex and expensive measures are provided to assure field symmetry and wave propagation at acceptable loss.

Experiments underlying this invention have shown that the degradation of the symmetrical wave field at such an extended distance, say a few thousand feet or a mile, is due to the fact that the symmetrical wave of the two-wire line, consisting of the two phase opposed waves of the individual wires, tends to become two more or less phase equalized waves of surface wave character, depending of course on the other means and conditions, such as nature of dielectric and suspension, required for the propagation of surface waves proper.

It is therefore one of the objects of the invention to provide such a two-wire line, which may be excited in any known way, with suspensions permitting the development and propagation of the two surface waves in a manner depending on the field radius of these waves, for example, by the provision of nylon strings and other low loss suspensions, for a distance corresponding to that field radius, or wave length dimension, i.e., a distance encompassing the greater part, preferably 90 percent of the field energy of the surface waves.

Another object of the invention is to provide pickup or additional launching of signal energy to and from the line, respectively, by means of antenna type loops or probes arranged substantially radially with respect to the line.

These and other objects of the invention will be more fully apparent from the drawings annexed herewith in which:

FIG. 1 represents schematically a two-wire line surface wave installation embodying certain principles of the invention.

FIG. 2 represents the same line in a cross-section thereof.

FIGS. 3 and 4 represent pickup or launcher device in side and top views respectively, useful, though not exclusively, with an installation device such as shown in FIGS. 1 and 2.

FIG. 2A shows part of FIG. 2 in detail.

FIGS. 5 and 6 represent a modification of FIGS. 1 and 2.

FIG. 6A shows part of FIG. 6 in detail.

FIG. 11 shows the feeding system of a surface wave transmission line such as shown in FIG 9.

FIG. 12 shows a modification thereof.

FIG. 13 shows another modification thereof.

Figure 7:
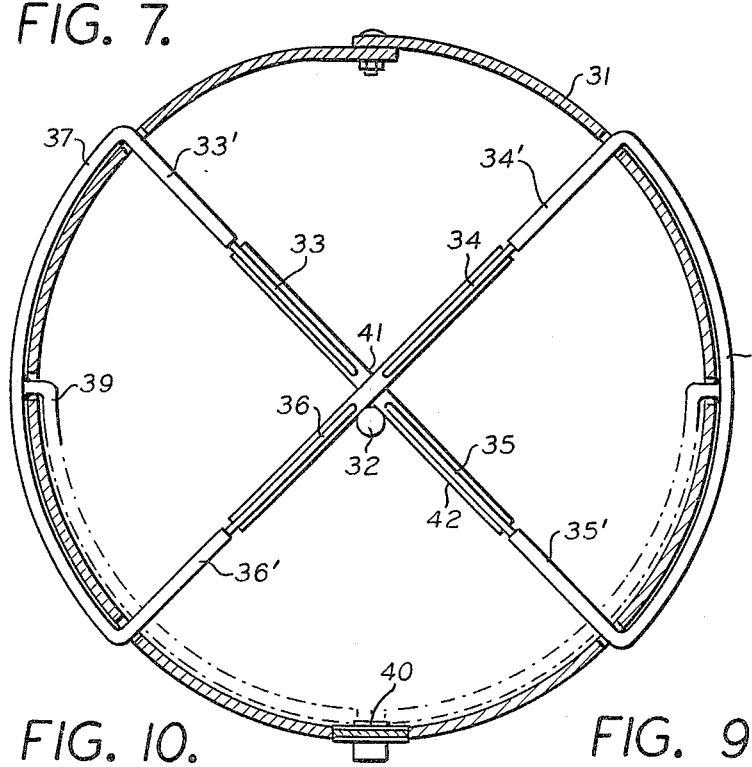
FIG. 7 shows another pickup means in accordance with the invention in front elevation.

As apparent from FIGS. 1 and 2, an ordinary twin wire line is shown at 1 suspended on nylon loops 2 at a distance of say, one to two feet from the pole arm or wall portion 3 to which it is to be attached.

The twin wire is connected in otherwise well known manner to a modulated frequency source 4 corresponding to the range of operation of the line, say the upper VHF range, i.e., 150 to 250 megacycles.

In this case and for the purpose of this invention, the initial portion 5 of the twin line immediately following the frequency source 4 may be considered to operate as a rather inefficient surface wave launcher, the twin wires during this section replacing inner and outer conductor of the coaxial launcher and receiver usually existing with surface wave transmission lines, such as disclosed in U.S. 2,685,068 and other patents and patent applications.

However, in view of the existence of the two waves during and after this section 5, a division of the symmetrical waves existing in launcher section 5 into phase equal surface waves occurs, favored by the surface wave suspensions provided by nylon strings 2, permitting propagation of these surface waves within a field radius 6, depending upon the nature of dielectric and the dimensions of the twin wire as well of course as of the frequency range of operation, as more clearly apparent from FIG. 2A.

Energy is received or launched into this surface wave transmission line by a loop 7 arranged symmetrically with respect to the two wires so as to receive energy from both fields, schematically indicated in FIG. 2 at 8, 9 respectively, in the form of equal phased magnetic field lines.

The corresponding electrical field lines are perpendicular thereto and can be picked up by a probe or a series of probes substantially perpendicular to the plane of the two wires and also in accordance with the invention substantially symmetrical thereto for maximum effect.

Such an electric pickup device is schematically illustrated in FIGS. 4 and 5 in a form which can also be effectively used to launch energy into a predetermined direction into the line as well as to receive from such direction.

In this case a metallic base plate 10 serves as the grounding plate of the device to which there is attached insulatingly a longitudinal pickup conductor 11 forming together with grounding plate 10 to a coaxial line of approximately wave length dimension which at one end is terminated by a resistance 12, of say 75 ohms, representing the matching impedance for coaxial connector provided at the other end of line 10, 11 and having an outer connection 13' connected to grounding plate 10 and an inner connection 13 connected to longitudinal conductor 11. Arranged on longitudinal conductor 11, supported thereon, are a number of conductors at one-eighth wave length distances spaced from each other, as indicated at 14 to 21 respectively, and serving as pick up and launching probes respectively for the reception and launching of waves in the direction of arrow 22.

The invention is of course not limited to this type of launching and receiving device either designed to be unidirectional or bidirectional.

The invention permits launching and receiving from stationary as well as moving objects, such as trains, vehicles in subways, as well as open wire locations where, in view of the limited extension of the surface wave field in accordance with the invention and its relatively high efficiency and relatively low power requirements, no interference with other transmission systems such as microwave by air systems is to be expected.

FIGS. 5 and 6 show a modification of the installation illustrated in FIGS. 1 and 2 providing a relatively larger field radius or field radii of the two surface waves. In this case, two independently insulated wires 23 and 24 are supported at a predetermined distance from each other, which in view of the relative insensitivity of the surface wave characteristic to suspension deviations is not critical, on a common nylon loop 25 extending from the top of tunnel wall 26 in the path of an antenna probe or probes, such as indicated in FIGS. 3 and 4 at 14 to 21, and supported on top of subway train schematically indicated at 27.

In order to favor one of the wire surface waves, the two wires may have different dimensions, especially different dielectric coatings as indicated in FIG. 6A.

Figure 8:
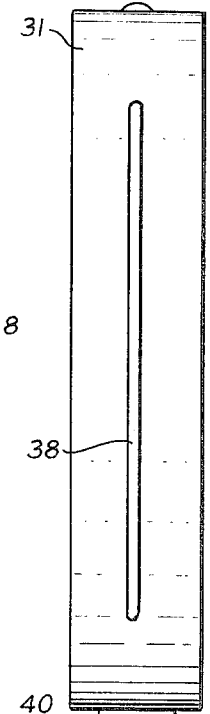
FIG. 8 is a corresponding side view.

As illustrated in FIG. 7 and FIG. 8 the grounding sheet indicated in FIG. 3 at 10 can be made of a circular shape as shown in FIGS. 7 and 8 and at 31 where the pickup conductors extending in the direction towards surface wave transmission line 32 are radially arranged as indicated at 33, 34, 35, and 36. These conductors are shown to be insulated at 33', 34', 35' and 36' respectively extending through grounding sheet 31 and interconnected by cable sections schematically indicated at 37, 38 respectively. Interconnections 37, 38 themselves are interconnected at their midpoints by a further connection on cable section schematically indicated at 39 and connected at 40 to the inner conductor of a coaxial connection, the outer conductor of which is connected to grounding sheet 31. Grounding sheet 31 together with conductors, 33, 34, 35, 36 is supported on surface wave transmission line 32 by means of fiber glass tubings schematically indicated at 41, 42 which are slipped over conductors 33 through 36, resting against the end portions of the insulation sections 33' through 36'. Additional insulating tape not shown may be used to attach fiber glass tubings 41, 42 to the surface wave transmission line 32 so as to permit the entire pickup unit to be supported on the surface wave transmission line at any desired pickup point.

Obviously, the pickup of FIG. 7 is not freely movable along the line in the same manner as the pickup of FIGS. 1 through 5 and 9. This, however, does not reduce the utility of the device, which permits a coaxial pickup to be arranged on a G-line intermediate the usual type of launching and receiving means at considerably lower cost and in a position in a manner which can be easily varied or adjusted.

In contrast to the pickup shown in FIG. 3 which is unidirectional the pickup shown in FIGS. 7 and 8 is bi-directional.

Figure 9:
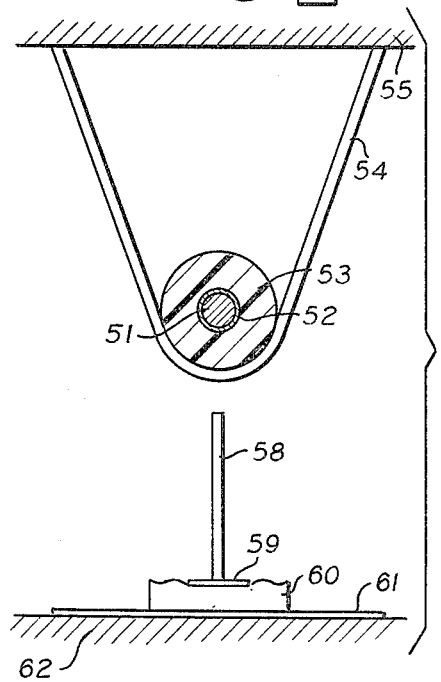
FIG. 9 shows the combination of pickup means according to the invention as applied to a single surface wave conductor in greater detail.

In order to practically construct and install surface wave transmission systems and pickup means such as shown and supported in FIGS. 1 through 8, in the modification of FIG. 9 a single wire surface wave transmission line consisting of a high tensile strength steel wire schematically indicated at 51 and copper plated at 52 is coated with a relatively heavy low loss polyethylene coating schematically indicated at 53 of a dielectric constant of approximately 2 having an outer diameter of about 5 times the size of the outer diameter of conductor 51, 52. The surface wave transmission line is supported by nylon strings indicated at 54 along the ceiling of a tunnel or similar structure schematically indicated at 55. In order to reduce losses of surface wave propagation as much as possible in addition to providing the 1:5 ratio between inner and outer diameter of the surface wave transmission line the distance between the surface wave transmission line and the ceiling while maintained at a minimum due to the usually restricted conditions prevailing in a tunnel is provided to be of the order of a magnitude which is several times the thickness of the dielectric coating 53. At the same time the suspension material in this case, nylon, or if necessary fiber glass structures and especially molded epoxy polyester may be provided should be of such a dielectric constant that the space occupied and surounded by these suspensions should provide a dielectric constant not much different from 1.

Figure 10:
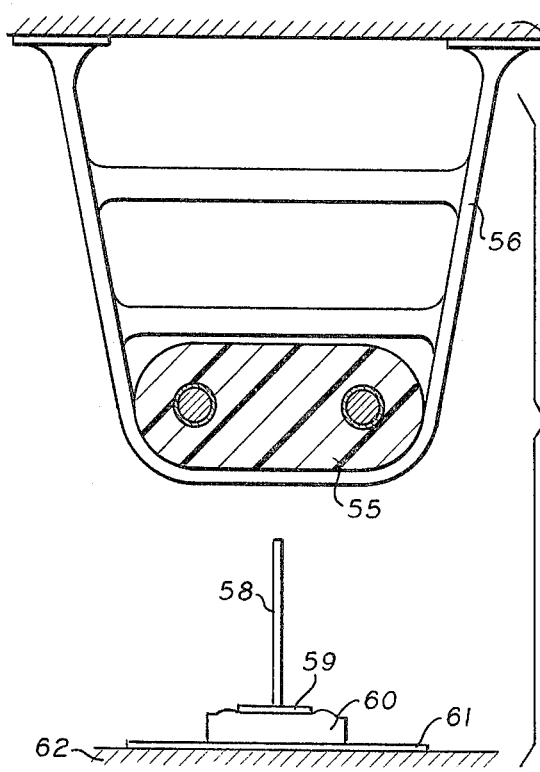
FIG. 10 shows a modification of FIG. 9 also embodying certain principles of the invention.

FIG. 10 shows the support of a two-wire transmission line of a relatively high ratio between inner and outer diameters, supported in accordance with the invention of fiber glass structure schematically indicated at 56 and maintaining, at a minimum, the distance between the wall of a tunnel or any other supporting wall, and the surface wave transmission line 55, said distances being relatively large schematically indicated at 57 against the outer diameter of the surface wave transmission line 55 whereby the actual space occupied by the material of fiber glass structure 56 is relatively so small against the air space encompassed that the overall dielectric constant of the space between surface wave transmission line 55 and wall 57 is not much different from 1, thereby reducing loss to a minimum.

Generally and especially in tunnels or other restricted locations reducing the space allowed for the transmission line, any of the transmission lines shown in FIGS. 1 through 10 are so dimensioned that their electric loss is substantially of the order or equal to the dielectric loss of the surface wave conductor, for example, for a No. 6 conductor of the order of about 10 db each in the VHF range or in a range from 50 to 250 mc.

This is in contrast to known surface wave transmission lines where the dielectric loss, for example of the order of only 2 db per mile as compared to the electric loss of 8 db per mile in the VHF range, or 3 db per mile and 10 db per mile respectively in the UHF range, for example, at a frequency of 450 to 460 mc.

In each of the FIGS. 9 and 10, respectively, in a position radial and symmetrically with respect to the corresponding surface wave transmission lines, the radial conductors 58 of a pickup are shown to be arranged in a structure similar to that shown in FIGS. 3 and 4 whereby the radial conductors 58 are connected by a straight connecting rod 59 and supported on through dielectric spacers 60 on grounding plate 61 which in turn may be supported on a vehicle such as a train or automobile schematically indicated at 62 passing through the tunnel and adapted to transmit and receive signals from and to the different transmission lines respectively.

FIGS. 11 and 12 show launching and receiving systems for any of the surface wave transmission lines such as shown in FIGS. 1 through 10.

In these embodiments of the invention baluns are used such as shown in my own United States patent specifications, 2,867,778, and 2,971,170.

However the invention is not limited to specific impedance transforming devices but may be applied with any other inter-couplings between surface wave transmission line and signal transmitter or signal receiver, respectively, as the case may be, without departing from the scope of this disclosure.

More specifically, as shown in FIG. 11, a surface wave transmission line schematically indicated at 60 consists of a relatively thick dielectric coating 61 and a conductor 62. The surface wave transmission line 60 extends gradually into a horn-shaped metal structure schematically indicated at 63 to which there are attached brackets schematically indicated at 64, 65, which form part of the balun structure, illustrated in FIG. 2 of U.S. 2,867,778. The conductor 62 is also connected to the inner conductor 66 of this balun structure at 67.

The output of the balun structure which is schematically designated as 68 is in the form of a standard two-wire line 69 which connects to the signal transmitter or signal receiver of the system as the case may be.

Similarly, according to FIG. 12, a two-wire surface wave transmission line 70 consisting of a pair of wires 71, 72 and a dielectric coating 73 all appropriately dimensioned in accordance with the invention, extend either through a horn similarly to that shown in FIG. 11 at 63 or is attached in gradual transition directly to the brackets 74, 75 of a balun structure schematically indicated at 76 and corresponding to part 2 in FIG. 1 of my United States patent specification, 2,971,170. The two conductors 71, 72 of the surface wave transmission line are connected through circuits similar to those indicated in FIG. 1 of the above mentioned patent specification to permit simultaneous transmission of signals through conductors 71, 72 in a balanced mode as well as of signals surrounding the transmission line 73 in a surface wave mode.

Both types of signals are fed into or from, as the case may be, balun 76 by a standard two-wire line schematically indicated in FIG. 12 at 77.

FIG. 13 shows the transformation of a two-wire way into a surface wave without the insertion of a balun but simply with extension and proper development and suspension of another two-wire line connecting the two-wire line coming from the terminal equipment, and the two-wire line forming the surface wave transmission line proper. In this particular instance, a two-wire line schematically indicated at 80 and arranged relatively close to the ceiling of the tunnel or any other wall or other structure supporting the entire system, is arranged to extend into or connected to another two-wire line schematically indicated at 81 having preferably relatively less dielectric coating so as to permit gradual expansion of the surface wave as has been found to occur over relatively long distances of the order of 100 wave lengths or more.

After such expansion, the two wire line now at 82, constituted or operating substantially as a surface wave transmission line and suspended at a distance larger than previously, but still smaller than field diameter or wave length and having as stated above a dielectric loss which is substantially equal to the electric loss, extends further in a manner stated in accordance with the previous illustrations and descriptions.

The invention is not limited to the particular configuration of twin wires and their launching and receiving means shown and described nor to their particular supports and arrangements, but may be applied in any form or manner whatsoever without departing from the scope of this disclosure.

I claim:

1. In a signal transmission system for a predetermined operating frequency range comprising surface wave conducting means and pickup means including a number of parallel conductors extending radially towards said surface wave conducting means and spaced from each other approximately at distances corresponding to the operating wave length divided by the number of said radial conductors; and a conducting sheet forming the ground plane for said pickup means and extending in a direction substantially perpendicular to said radial conductors; said radial conductors being conductively interconnected by conducting means extending substantially parallel to said ground forming sheet, spaced therefrom in such a manner so that said conducting means together with said ground forming sheet constitute a coaxial line of predetermined impedance and a coaxial cable connected to said coaxial line.

2. System according to claim 1, wherein said grounding sheet extends into a plane and said conducting means consists of a straight conductor spaced from said grounding sheet and connected at one end thereof by resisting means with said ground forming sheet; the coaxial cable being connected to the other end to said conducting means and said ground forming sheet, respectively, whereby the outer conductor of said coaxial cable is connected to said grounding sheet and the inner conductor of said coaxial cable is connected to said straight conducting means.

3. In a signal transmission system for a predetermined operating frequency range comprising surface wave conducting means and pickup means including a number of conductors and a grounding sheet which is cylindrically shaped and wherein the conductors extend inside said cylindrical sheet radially toward said surface wave conducting means; the base ends of said radial conductors being interconnected in such a way that the different interconnections form a coaxial line of predetermined impedance, the outer conductor of which is represented by said circular sheet and the inner conductor of which is represented by one of said interconnections, and a coaxial cable connected to said grounding sheet and said interconnections respectively.

4. In a signal transmission system for a predetermined operating frequency range, at least one conductor, at least partially coated on its entire length, by a coating of a dielectric constant of at least 2 and of a thickness which is small against wave length but large against the diameter of the conductor, and which is sufficient to maintain around said conductor a surface wave, ground supporting means, and insulating mounting means for suspending said conductor, on said ground supporting means at predetermined distances along the extension of said conductor; said conductor being spaced from said ground supporting means at distances which are large against the thickness of said dielectric coating but substantially smaller than said wave length; said insulating means together with any other matter contained in the space between conductor and ground supporting means representing a dielectric constant substantially smaller than that of said dielectric coating, pickup means including a number of parallel conductors extending radially towards said conductor; and spaced from each other approximately at distances corresponding to the operating wave length divided by the number of said radial conductors; and a conducting sheet forming the ground plane for said pickup means and extending in a direction substantially perpendicular to said radial conductors; said radial conductors being conductively interconnected by conducting means extending substantially parallel to said ground forming sheet, spaced therefrom in such a manner so that said conducting means together with said ground forming sheet constitute a coaxial line of predetermined impedance, and a coaxial cable connected to said coaxial line; said radial conductors being spaced from said surface wave conductor at a distance approximately of the order of the distance between surface wave conductor and ground supporting means.

5. In a signal transmission system for a predetermined operating frequency range, a pair of parallel conductors, at least partially coated on their entire length by a coating of a dielectric constant of at least 2 and of a thickness which is small against wave length but large against the diameter of the conductor, and which is sufficient to maintain around said conductors at least one surface wave, ground supporting means, and insulating mounting means for suspending said conductors on said ground supporting means at predetermined distances along the extension of said conductors; said conductors being spaced from said ground supporting means at distances which are large against the thickness of said dielectric coating but substantially smaller than said wave length; said insulating means together with any other matter contained in the space between conductors and ground supporting means representing a dielectric constant substantially smaller than that of said dielectric coating, and pickup means including a number of parallel conductors extending radially towards said surface wave conductors and spaced from each other approximately at distances corresponding to the operating wave length divided by the number of said radial conductors; and a conducting sheet forming the ground plane for said pickup means and extending in a direction substantially perpendicular to said radial conductors; said radial conductors being conductively interconnected by conducting means extending substantially parallel to said ground forming sheet, spaced therefrom in such a manner so that said conducting means together with said ground forming sheet constitute a coaxial line of predetermined impedance and a coaxial cable connected to said coaxial line; said radial conductors being arranged substantially symmetrically with respect to said pair of surface wave conductors at a distance approximately of the order of the distance between said surface wave conductors and said ground supporting means.

6. Surface wave pickup means including a number of parallel conductors extending in a direction perpendicular to the direction of the surface wave and spaced from each other approximately at distances corresponding to the operating wave length divided by the number of said conductors; and a conducting sheet forming the ground plane for said pickup means and extending in a direction substantially perpendicular to said conductors; said conductors being conductively interconnected by conducting means extending substantially parallel to said ground forming sheet, spaced therefrom in such a manner so that said conducting means together with said ground forming sheet constitute a coaxial line of predetermined impedance and a coaxial cable connected to said coaxial line.

7. Surface wave pickup means according to claim 6, wherein said grounding sheet extends into a plane and said conducting means consists of a straight conductor spaced from said grounding sheet and connected at one end thereof by resisting means with said ground forming sheet; the coaxial cable being connected to the other end to said conducting means and said forming sheet, respectively, whereby the outer conductor of said coaxial cable is connected to said grounding sheet and the inner conductor of said coaxial cable is connected to said straight conducting means.

8. Surface wave pickup means including a cylindrical grounding sheet coaxial with the surface wave and a number of conductors extending radially inside said cylindrical sheet toward its center; the base ends of said radial conductors being interconnected in such a way that the different interconnections form a coaxial line of predetermined impedance, the outer conductor of which is represented by said cylindrical sheet and the inner conductor of which is represented by one of said interconnections, and a coaxial cable connected to said grounding sheet and said interconnections respectively.

References Cited by the Examiner
UNITED STATES PATENTS

| | | | |
|---|---|---|---|
| 2,478,133 | 8/1949 | Shanklin | 179—82 |
| 2,659,004 | 11/1953 | Lindenblad | 343—731 |
| 2,867,778 | 1/1959 | Hafner | 333—33 |
| 2,921,979 | 1/1960 | Hafner | 179—2.5 |
| 2,971,170 | 2/1961 | Hafner | 333—9 |

HERMAN K. SAALBACH, *Primary Examiner.*

L. ALLAHUT, *Assistant Examiner.*